Aug. 22, 1961  R. W. GILBERT  2,997,667
METHOD AND MEANS OF MODULATION
Filed May 15, 1958
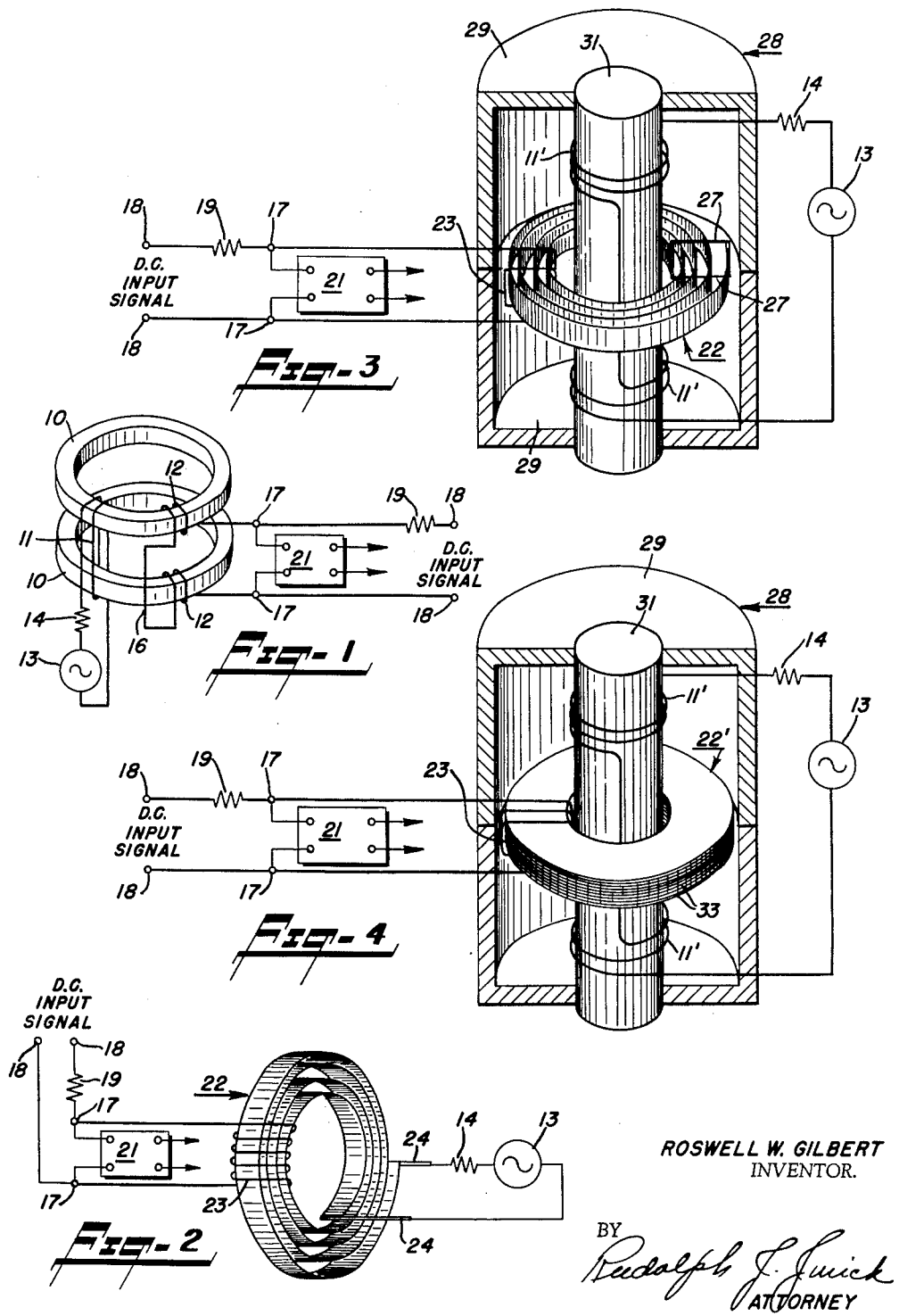
ROSWELL W. GILBERT
INVENTOR.
BY
Rudolph J. Jurick
ATTORNEY

United States Patent Office 2,997,667
Patented Aug. 22, 1961

2,997,667
METHOD AND MEANS OF MODULATION
Roswell W. Gilbert, East Orange, N.J., assignor to Daystrom, Incorporated, Murray Hill, N.J., a corporation of New Jersey
Filed May 15, 1958, Ser. No. 735,560
2 Claims. (Cl. 332—51)

This invention relates to a method and means of modulation in which a D.-C. input signal is passed through a winding on a core of magnetic material, while the permeability of the said core is modulated by an A.-C. exciting current which is in non-inductive relationship with the said winding.

In many prior art methods of modulation, modulating and exciting circuits are employed which include windings which are coupled through the magnetic non-linearity of magnetic cores upon which the windings are wound. Since the exciting signal is not desired in the modulating circuit, suitable coil arrangements and connections are employed to balance out the exciting signal in the modulating circuit. In one contemporary form of modulator, which is in common use, two carefully balanced toroidal cores are used which have a balanced winding relationship between the exciting and modulating circuits, the said balanced pair of cores being excited by varying the permeability of the non-linear magnetic material. The performance of such prior art modulating and modulation method is usually limited by the practical order of balance obtained, to minimize the coupling of a spurious signal from the excitation source into the modulated circuit.

In the method of modulation of my invention I pass a D.-C. input signal through a winding on a core of magnetic material. The permeability of the core is modulated by an A.-C. exciting current which is in non-inductive relation with the said winding. In this manner, there is a zero direct coupling between the modulating winding through which the D.-C. input signal is passed, and the A.-C. exciting current; the modulator and exciting circuits being coupled only through the modulated permeability of the core.

An object of this invention is the provision of a method of modulation which comprises passing a D.-C. input signal through a winding on a magnetic core, and varying the permeability of the said magnetic core by passing an A.-C. exciting current through the core in non-inductive relation to the said winding.

An object of this invention is the provision of a modulator comprising a torus of ferromagnetic material and having a toroidal modulating winding thereon to which a D.-C. input signal is connected, and means passing an A.-C. exciting current through the said torus in non-inductive relationship with the D.-C. input signal to thereby modulate the permeability of the torus.

An object of this invention is the provision of a modulator comprising a spiral wound tape core, means passing an A.-C. exciting current directly through the said core to modulate the core permeability, and a modulating winding wound upon the said core to which a D.-C. input signal is connected.

An object of this invention is the provision of a modulator comprising a torus of ferromagnetic material, a modulating winding wound thereon to which a D.-C. input signal is connected, a magnetic circuit extending through the torus axially thereof, exciting windings wound upon the said magnetic circuit and means passing an A.-C. exciting current through the said exciting windings to modulate the permeability of the said torus, the said exciting windings and modulating winding having a zero mutual coefficient of coupling except through the magnetic non-linearity of the said torus.

An object of this invention is the provision of a modulator comprising a torus of ferromagnetic material, a modulating winding wound upon the said torus, and means including an exciting current in non-inductive relationship with the said modulating winding for varying the permeability of the said torus.

These and other objects and advantages will become apparent from the following description when taken with the accompanying drawings. It will be understood that the drawings are for purposes of illustration, and are not to be construed as defining the scope or limits of the invention, reference being had for the latter purpose to the appended claims.

In the drawings wherein like reference characters denote like parts in the several views:

FIGURE 1 is a diagrammatic view of one common prior art form of even harmonic modulator;

FIGURE 2 is a diagrammatic view of a core-conduction excited modulator embodying my invention;

FIGURE 3 is a diagrammatic view of a transverse induction magnetic modulator embodying my invention; and FIGURE 4 is a modified form of the invention shown in FIGURE 3.

Reference is first made to FIGURE 1 of the drawings wherein there is diagrammatically shown one common form of prior art even harmonic modulator which comprises two toroidal cores 10, 10, made of ferromagnetic material, having an exciting winding 11 which extends through both cores, and a pair of modulating windings 12, 12 individually wound on the toroidal cores 10, 10. A source of A.-C. excitation current 13 is connected to the exciting winding 11 through a current limiting resistor 14. The modulating windings are connected together through a lead wire 16, and the free ends connected to terminals 17, 17. A D.-C. input signal is connected through terminals 18, 18, and a load resistor 19, to the terminals, 17, 17 of the modulating windings 12, 12. A modulated A.-C. output signal is obtained at the terminals 17, 17 and fed to an A.-C. amplifier 21, and thence to a suitable utilization circuit, not shown.

The prior art modulator of FIGURE 1 is carefully balanced such that with no D.-C. input signal in the modulating windings 12, 12, the exciting signal induced in each of the windings, is cancelled out whereby no A.-C. output signal appears at the terminals 17, 17. The A.-C. exciting signal serves to modulate the permeability of the cores 10. Therefore, when a D.-C. signal is applied to the modulating windings 12, 12, a modulated impedance is presented to the D.-C. signal, modulating the same, as is well understood by those skilled in this art. The permeability of the core material varies non-linearily with the excitation therein whereby the A.-C. output signal comprises only even harmonics of the excitation frequency.

The performance of such prior art system is limited by the practical order of balance obtained, to minimize the direct coupled spurious signal from the exciting circuit to the modulating circuit. Obviously, the balance obtained depends upon the manufacturing precision and tolerances with which the modulator is constructed. A high degree of skill is required in the manufacture of the modulator to obtain a critical balance. A further disadvantage arises from the fact that the arrangement is susceptive to unbalance due to creep and temperature differentials. In the modulator of my invention, no carefully balanced condition is necessary and, therefore, the modulator is more amenable to practical manufacturing techniques and is not susceptive to unbalance.

Reference is now made to FIGURE 2 wherein there is diagramatically shown a modulator embodying one form of my invention, which modulator includes a tape wound torus of ferromagnetic or high-permeability material 22 upon which is wound a toroidal modulating winding 23, the ends of which are connected to terminals 17, 17. A D.-C. input signal is connected through the terminals 18, 18 and the load resistor 19, to the terminals 17, 17. The modulated output signal, which appears at terminals 17, 17, is fed through the amplifier 21 to a utilization circuit, not shown.

The permeability of the core 22 is modulated by passing the exciting current from the exciting current source 13 and series resistor 14, directly through the core material through leads 24, 24. The exciting current magnetizes the tape-wound torus, and modulates its permeability in the circumferential direction by non-inductive saturation. (It will be noted that permeability of the magnetic core is modulated by transverse excitation, in contrast to the conventional in-line core excitation shown in FIGURE 1.) A modulated impedance is presented to any D.-C. input signal present in the modulating winding 23. Since the permeability of the core varies non-linearly with core excitation, the modulation product will be an even harmonic train of the fundamental frequency of the excitation source 13, as in the prior art two-core modulator.

In the modulator shown in FIGURE 2, the A.-C. exciting current is applied to the spiral wound tape core by direct conduction to the ends of the tape. In another form of modulator embodying my invention the exciting current is induced in the torus, which functions as a secondary of a transformer. Reference is made to FIGURE 3 wherein there is diagrammatically shown such an "induction type" modulator which may comprise a tape-wound torus 22, as before. The ends of the core tape are connected by jumpers 27, 27, whereby an exciting current may be induced in the tape as a secondary of a transformer, in a manner described below. It will be noted that one jumper is carried around each side of the torus since a single jumper around one side only would act as an effective half-turn around the core causing unbalance and a direct coupling through the system.

The exciting transformer, which includes the torus 22 as the secondary thereof comprises, preferably, a cylindrical closed cup core 28 having a pair of cup-shaped members 29 (shown in cross-sectional view) and a circular cross-sectional shaped leg 31 extending axially therethrough. To prevent the exciting core 28 from forming a closed conducting turn about the torus, it is made of suitable non-conducting material, such as ferrite, or a circuit break gap (not shown) is provided therein. A pair of primary exciting windings 11', 11' are wound on the leg 31 of the exciting transformer, which windings are connected in series to the A.-C. exciting current source 13 through the resistor 14. The connections to the windings 11', 11' are such that an aiding magnetic flux field is established through the leg 31 and torus 22. The usual toroidal modulating winding 23 is provided on the torus, which winding is connected to the D.-C. input terminals 18, 18 in the manner of FIGURE 2.

The A.-C. exciting current from the current source 13 flows through the primary windings 11', 11' of the exciting current transformer 28 whereby the exciting current is induced in the torus 22 as the secondary of the transformer. Again, the permeability of the core 22 is modulated and, since the transformer windings 11', 11' and torus 22 are in non-inductive relationship with respect to the modulating winding 23, there is zero direct coupling therebetween. The only existing coupling is through magnetic non-linearity within the torus whereby a modulated impedance is presented to the D.-C. input signal in the modulating winding 23. The resultant A.-C. signal appears at the terminals 17, 17 and may be amplified by the amplifier 21.

In a modulator of the type described, and shown in FIGURE 3, wherein the exciting current is induced in the torus 22, it will be understood that the torus need not be of the tape-wound type. Reference is made to FIGURE 4 wherein there is shown a modulator in which a torus 22' made of stacked punched ring laminae 33 is used in place of the tape wound core. Such a core provides a circumferential current path about the rings. With the tape-wound core, the circumferential current path is provided by connecting the inner and outer ends of the tape by the jumpers. Obviously, no jumpers are required for the core of punched ring laminae, since the circumferential current path is complete.

The modulators of FIGURES 3 and 4 are fully symmetrical structures having no inherent unbalances or balancing requirements. The exciting and modulating windings 11', 11' and 23, respectively, have zero coupling coefficient except through magnetic non-linearity within the torus. With the transverse induction magnetic modulator of the type shown in FIGURES 3 and 4, a conversion transfer resistance of approximately one megohm with a modulating winding resistance of about 20 ohms is easily obtained, to provide a conversion figure-of-merit of about 50,000.

Systems employing transverse modulation of the tape-wound type of FIGURE 3, appear to characteristically exhibit a more pronounced second harmonic output waveform than the prior art two core system of FIGURE 1. This is often an advantage because the following electronic circuitry usually selects the second harmonic and rejects the higher orders. The reason for this effect, while not quantitatively known, probably results from progressive skin-effect saturation of the core tape. Theoretically, the tape should saturate from the skin inwardly with rising exciting current waveform, in contrast to the presumed non-selective distribution when the core is in-line saturated, as in the contemporary method of FIGURE 1. The single major advantage of the modulators of FIGURES 3 and 4 over the two-core system is, however, inherent rather than balanced symmetry. Without a requirement for critical balance the modulator of my invention is more amenable to practical manufacture and is not susceptive to unbalance due to creep and temperature differentials.

Having now described my invention in detail in accordance with the requirements of the patent statutes, various other changes and modifications will suggest themselves to those skilled in this art, and it is intended that such changes and modifications shall fall within the spirit and scope of the invention as recited in the following claims.

I claim:

1. A modulator comprising a toroidal core having a circumferential current path; a winding on said toroidal core; means for applying a direct-current input signal to the said winding; an exciting transformer having an inner cylindrical core portion extending axially through the said toroidal core and an outer core portion enclosing the said toroidal core; series connected exciting windings wound upon the cylindrical core portion of the exciting transformer at opposite sides of said toroidal core, and means for causing an alternating exciting current to flow through the said exciting windings; the alternating exciting current being transformer coupled to the said toroidal core to cyclically vary the permeability thereof.

2. The invention as recited in claim 1, wherein the said toroidal core comprises a tape wound in spiral fashion, and a low resistance connection between the ends of the tape, said low resistance connection passing around both sides of the toroidal core.

References Cited in the file of this patent

UNITED STATES PATENTS

| 847,008 | Kitsee | Mar. 12, 1907 |
| 1,794,717 | Lindenblad | Mar. 3, 1931 |
| 2,075,380 | Varian | Mar. 30, 1937 |
| 2,727,211 | Dewitz | Dec. 13, 1955 |
| 2,752,559 | Lipkin | June 26, 1956 |